United States Patent [19]
Erbse et al.

[11] Patent Number: 6,071,015
[45] Date of Patent: Jun. 6, 2000

[54] ELECTRICAL PLUG DEVICE INCLUDING OPTICAL PLUG AND SOCKET CONNECTORS, TERMINAL CLAMPS CONNECTING TO ELECTRIC MAINS, AND AN ELECTRONIC BUS COUPLER

[75] Inventors: Karl-Ulrich Erbse, deceased, late of Gummersbach, by Ria Christine Erbse heiress; Klaus Gringmann, Gummersbach; Helmut Schmidt, Gummersbach; Manfred Stefanski, Gummersbach; Richard Vicktorius, Köln, all of Germany

[73] Assignee: Gebr. Merten GmbH & Co. KG, Wiehl, Germany

[21] Appl. No.: 08/930,121

[22] PCT Filed: Apr. 11, 1996

[86] PCT No.: PCT/EP96/01549

§ 371 Date: Nov. 5, 1997

§ 102(e) Date: Nov. 5, 1997

[87] PCT Pub. No.: WO96/35133

PCT Pub. Date: Nov. 7, 1996

[30] Foreign Application Priority Data

May 6, 1995 [DE] Germany .............................. 195 16 707
Jun. 5, 1995 [DE] Germany .............................. 195 19 935
Nov. 11, 1995 [DE] Germany .............................. 195 42 167

[51] Int. Cl.⁷ ...................................................... G02B 6/42
[52] U.S. Cl. ................................................. 385/88; 385/53
[58] Field of Search ................................... 385/53, 55, 56, 385/58–60, 75–78, 88–94

[56] References Cited

U.S. PATENT DOCUMENTS

| | | | |
|---|---|---|---|
| 4,767,168 | 8/1988 | Grandy | 385/53 |
| 4,993,803 | 2/1991 | Suverison et al. | 385/88 |
| 5,109,452 | 4/1992 | Selvin et al. | 385/60 X |
| 5,242,315 | 9/1993 | O'Dea | 385/59 X |
| 5,325,453 | 6/1994 | Drissler | 385/75 |
| 5,345,527 | 9/1994 | Lebby et al. | 385/89 X |
| 5,367,593 | 11/1994 | Lebby et al. | 385/53 |
| 5,394,503 | 2/1995 | Lietz, Jr. et al. | 385/88 X |
| 5,461,688 | 10/1995 | Lee | 385/75 |

FOREIGN PATENT DOCUMENTS

| | | |
|---|---|---|
| 0437696 A1 | 11/1990 | European Pat. Off. . |
| 0649192 A2 | 10/1994 | European Pat. Off. . |
| 3227770 A1 | 1/1984 | Germany . |
| 8803966 U | 6/1988 | Germany . |
| 2110410 | 6/1983 | United Kingdom . |

*Primary Examiner*—John D. Lee
*Attorney, Agent, or Firm*—Diller, Ramik & Wight, PC

[57] ABSTRACT

A socket (10) for connecting a plug (15) to installed mains lines (17) has its base (12) provided with a casing (18) in which an electronic bus coupler (BA) is arranged. The bus coupler (BA) is connected to a bus line (19) also installed. Signals generated by the bus coupler (BA) are converted into optical signals by a photoelectric converter (21) and transmitted to the plug (15) The plug (15) comprises the end of an optical wave-guide (23) which extends through the connected cable (24) besides the electric supply lines. Thus it is achieved that the signals are present as optical signals in the cable (24) and cannot be influenced by electric disturbances.

29 Claims, 10 Drawing Sheets

ND PLUG AND SOCKET
ELECTRICAL PLUG DEVICE INCLUDING OPTICAL PLUG AND SOCKET CONNECTORS, TERMINAL CLAMPS CONNECTING TO ELECTRIC MAINS, AND AN ELECTRONIC BUS COUPLER

BACKGROUND OF THE INVENTION

The present invention refers to an electrical plug device with a socket though which a load can be connected to the mains.

SUMMARY OF THE INVENTION

From DE 32 26 265 A1, a flexible electric cable is known which, besides the electric supply lines for connecting a device to the mains, comprises an optical waveguide via which signals may be transmitted. While electric signal lines placed in a common cable together with supply lines suffer interferences from the supply lines (cross-talk noise), light signals are not influenced by currents or voltages on the supply lines.

From DE 32 27 770 C2, an electrical plug device in the form of a socket is known, which allows for the connection of a power line to installed mains lines and further optically couples a light waveguide installed in the building to an optical waveguide of the line to be connected. To this avail, at least one contact portion of the electrical plug device of the socket is simultaneously arranged as a plug device for an optical waveguide. Thus, the plug device connects the electric and the optic portions of a cable to the building-side electric main lines and the optical data lines.

In recent years, in-house information distribution technology has become ever more important. Here, data telegrams are transmitted via a bus line system installed in the building. The bus line system includes electric bus couplers adapted to generate data telegrams and input them into the bus line system and to receive and evaluate data telegrams. The bus couplers are respectively connected to an external electric appliance. Thus, it is possible to monitor, remote-control or switch electric appliances in the building via the bus line system. Such a signal transmission system for in-house information distribution technology is described in EP 0 344 609 B1.

It is the object of the present invention to provide an electrical plug device allowing for the simultaneous connection of an electric appliance to the mains and to an electric bus line system without the data lines in the cable to be connected being influenced by the mains lines.

The plug device of the present invention is generally designed on the basis of common sockets for mains supply. Such sockets comprise a base fastened to a holder, contact elements and terminal clamps for main lines. According to the invention, a bus coupler is provided in or separate from the socket, the coupler being connectable to a building-side electric bus line. This bus coupler is an electric device adapted to perform an electronic telegram transfer with other bus couplers, e.g., a "Bus Interface Module" (BIM). Accordingly, the bus coupler may be designed as an intelligent version (including a microprocessor) or as a passive version (without microprocessor). For example, it comprises a microprocessor and electronic memories. The bus coupler is connected to a photoelectric transducer included in the socket and adapted to communicate with an optical waveguide via a window in the cover of the socket, the optical waveguide terminating in the associated plug adapted to be plugged into the socket. Thus, the socket not only serves to establish electric or optic connections, but at the same time it converts electric signals into light signals or light signals into electric signals. Whereas the data processing is performed in the building-side electric in-house information distribution system, it is the purpose of the socket to convert signals transmitted by the connected appliance via optical waveguides into electric signals and/or to convert electric signals generated by the bus coupler into light signals for the appliance connected therewith. In this manner, the usual electric in-house information distribution systems may be used that are uncoupled from the mains and are thus not influenced by the mains, while the connection of the electric appliance is made by a flexible cable in which the electric mains lines are combined with optical waveguides. The signals in the optical waveguides are not disturbed by voltages or currents on the mains lines so that no cross-talk noise occurs.

According to the invention, the transition between electronics and optical signal technology is provided in the socket itself so that no additional apparatus are required and the connection of an electric appliance may be done in the usual manner by simply plugging a plug into a socket. The analog or digital electric signals transmitted via the data bus are converted into optical signals in the socket. These optical signals are transmitted within the electric connection cable and converted again into electric signals in the appliance. In general, the signal flow between the appliance and the data bus is bidirectional. This bidirectional data flow may pass over two optical waveguides (one for either direction) or it may occur in a single conductor mode if one time slot is available for one direction and another time slot is available for the counter-direction.

The exchange of the optical signals occurs through at least one window in the cover of the socket. Preferably, the passage opening or the transfer opening between the socket and the plug is approximately flush with the bottom wall and the plug is approximately flush with the bottom wall of the cover. This means that the light receiving opening of the plug is located in the front end wall of the plug which is in surface-to surface abutment on the bottom wall of the socket cover when the plug is completely inserted.

It is a particular advantage that the socket may selectively be operated with and without optical signal transmission, depending on whether the plug used allows for light transmission or not. When a usual plug exclusively adapted for connection to the mains is inserted into the socket, the socket works as a normal electric socket without data transfer.

It has always been a problem in optical signal transmission to couple the transmitter and receiver diodes to the optical waveguide. To do this, the end of the optical waveguide must be positioned very exactly with respect to the diodes. Since the light transmission opening is provided in the bottom wall of the cover, such an exact positioning is guaranteed, because the plug is centered when inserted into the cover of the socket.

It falls within the scope of the invention to dispose the photoelectric converter (as transmitter or receiver) in the front portion of the socket, i.e. in the vicinity of the window of the pot-shaped cover, whereby a short light path to the optical waveguide of the plug is achieved. It is another possibility to provide the converter at the bus coupler and to connect it to an optical waveguide transmitting the light to the passage opening.

The bus coupler may be provided behind the base or in a casing projecting laterally from the base and being formed integral therewith. In the latter case, a double wall socket is feasibly used as the socket which leaves enough space beside the base for the bus coupler to be installed. The bus coupler may also be provided as a separate unit apart from the socket, e.g., in a wall socket of its own.

In the context of the present invention, a photoelectric converter is a converter that either converts electric signals into optic signals or optic signals and electric signals.

The data bus preferably is an electric data bus according to the "European Installation Bus Association" (EIBA). The bus coupler BA may, for example, be designed as a "Bus Interface Module" (BIM).

The invention effects a safe transmission of light from the socket to the plug and vice versa, the light losses due to lateral offset, angular offset and separation at the air gap being maintained so low that the function of the data transfer is not disturbed thereby.

The following is a detailed description of embodiments of the invention taken in conjunction with the accompanying drawings.

BRIEF DESCRIPTION OF THE DRAWINGS

FIG. 6 is a rear view of the socket, FIG. 7 an enlarged view of the transition area between optic and electric signals according to FIG. 5, FIGS. 7a–7c are different modifications of the transition area.

DESCRIPTION OF THE PREFERRED EMBODIMENTS

Figure 1:
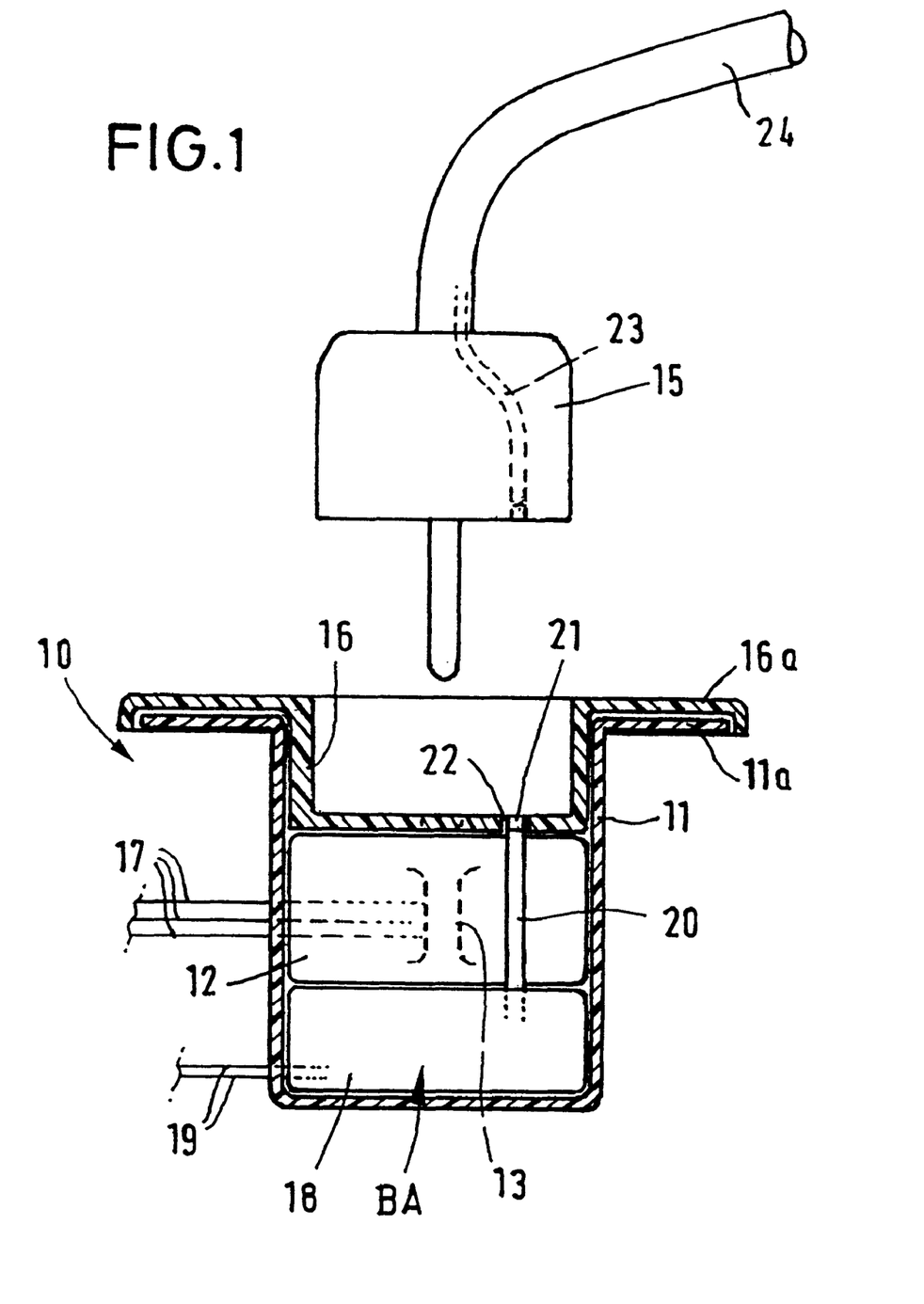
FIG. 1 is a schematic representation of the structure of the electrical plug device.
Figure 2:
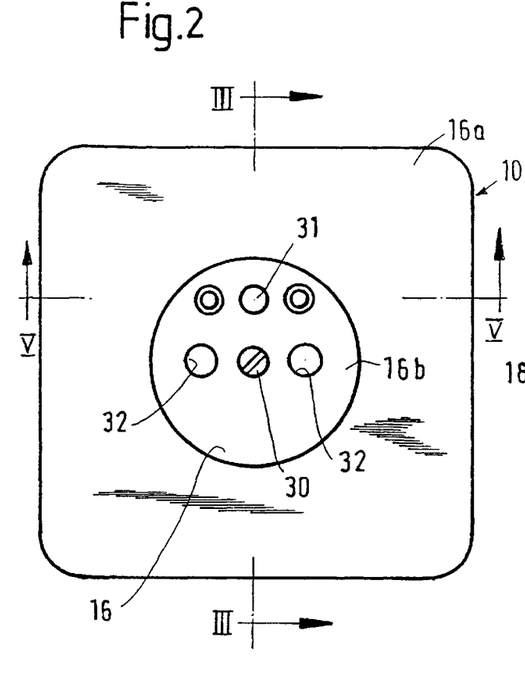
FIG. 2 is a front view of the plug device.
Figure 3:
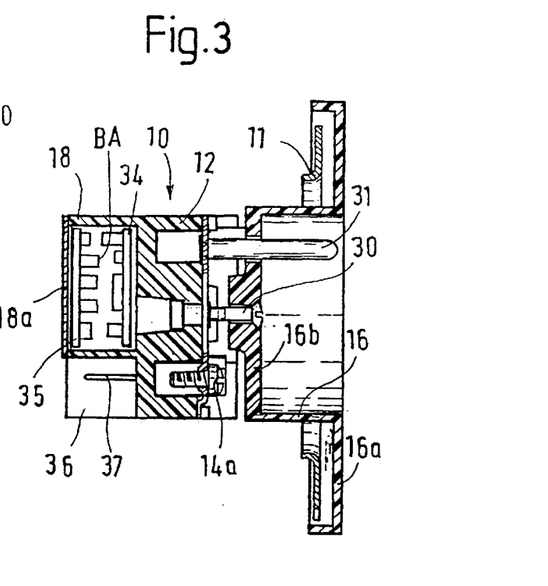
FIG. 3 is a section taken along line III—III in FIG. 2.

As illustrated in FIG. 1, the socket 10 comprises a holder 11 which, in the present case, is made of metal and carries all components of the socket. The holder 11 has a front frame 11a by which it is supported on a wall in the vicinity of a flush socket. Further, the holder 11 has claws for fastening the socket in a flush socket.

The holder 11 comprises a base 12 of insulating material at which terminal clamps 14 for main lines 17 and contact elements 13 for the plug pins of a plug 15 are provided. Toward the front side, a pot-shaped cover 16 of plastics material is set into the holder or frame 11, which extends to the base 12 and is screwed thereto. The cover 16 has holes for the passage of the contact pins of the plug 15. At the front side, the cover 16 is provided with a cover flange 16a set onto the front frame 11a of the holder 11. The cover 16 forms a receptacle for the plug 15.

Main lines 17 of the mains lead to the terminal clamps 14 of the base 12. These mains lines may have a voltage of, e.g., 230 V and 50 Hz.

On the rear side of the base 12, there is a casing 18 in which an electric bus coupler unit BA is housed. The bus coupler unit BA is connected to a bus line 19 installed in the building, the bus line either being a two-wire line or a coaxial line. The bus line 19 is a data line operated at low voltages, on which signals in digital or analogue form are transmitted.

A passage 20 leads from the casing 18 through the base 12 to a photoelectric converter 21 disposed in a window 22 of the bottom wall of the cover 16.

The plug 15 to be plugged into the socket 10 comprises an optical waveguide 23, the end 23a of which is exactly opposite the converter 21 when the plug 15 is inserted correctly into the socket 10. The plug 15 is connected to a flexible cable 24 leading to an electric appliance (not illustrated) that is controlled via the bus line 19 or transmits information to the bus line 19. The cable 24 comprises both the electric mains lines for operating the electric appliance and the optical waveguide 23.

FIGS. 2–7 provide more detailed illustrations of the plug device of FIG. 1. In the front view of FIG. 2, only the pot-shaped cover 16 with the surrounding cover flange 16a of the socket is visible. This cover is fastened to the base 12 with a screw 30. The front of the base 12 is provided with terminal clamps 14 and 14a for the mains lines 17 that are in contact with one of the elastic contact elements 13, respectively. The terminal clamp 14a is connected to a protective conductor pin 31 extending through an opening in the bottom wall 16b of the cover 16 so as to engage a contact element of the associated plug. The protective conductor pin 31 simultaneously acts as a non-reversibility means that guarantees that the plug can always be plugged into the socket 12 in just one plug orientation. Above the contact elements 13, the bottom wall 16b of the cover 16 is provided with holes 32 for the passage of the contact pins of the plug associated with the socket.

Figure 4:
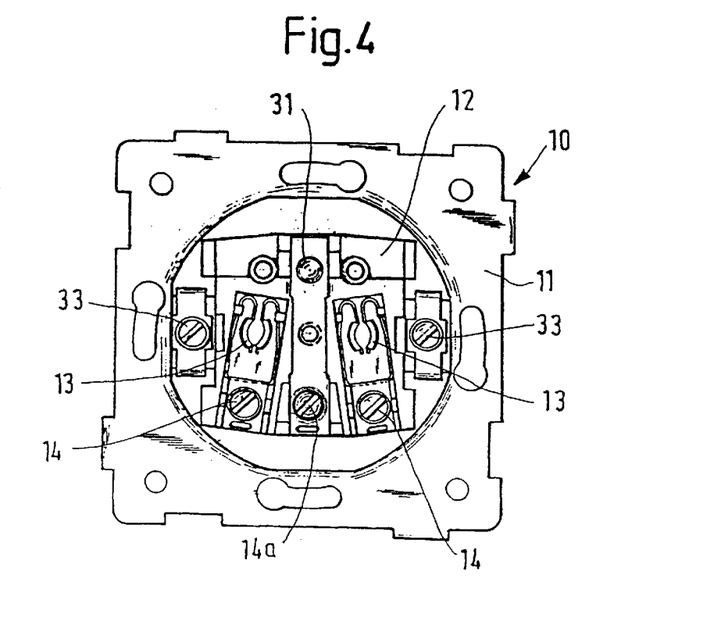
FIG. 4 is a front view with the cover removed.

As illustrated in FIG. 4, tensioning screws 33 are provided on both sides of the socket 12 which may be tightened to extend spreader claws laterally. These spreader claws serve to retain the socket in a dummy socket which may be a flush socket, for example.

Figure 5:
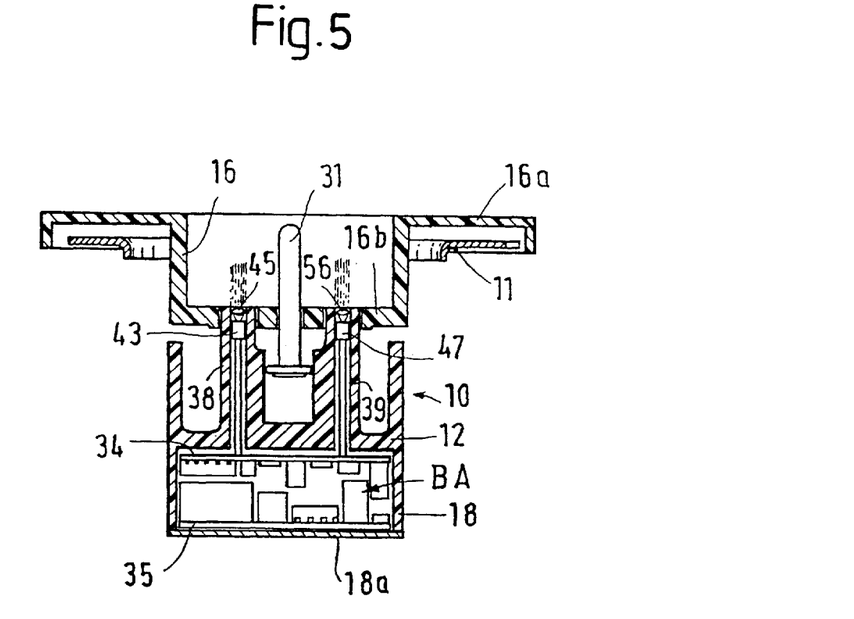
FIG. 5 shows a section along line V—V in FIG. 2.
Figure 6:
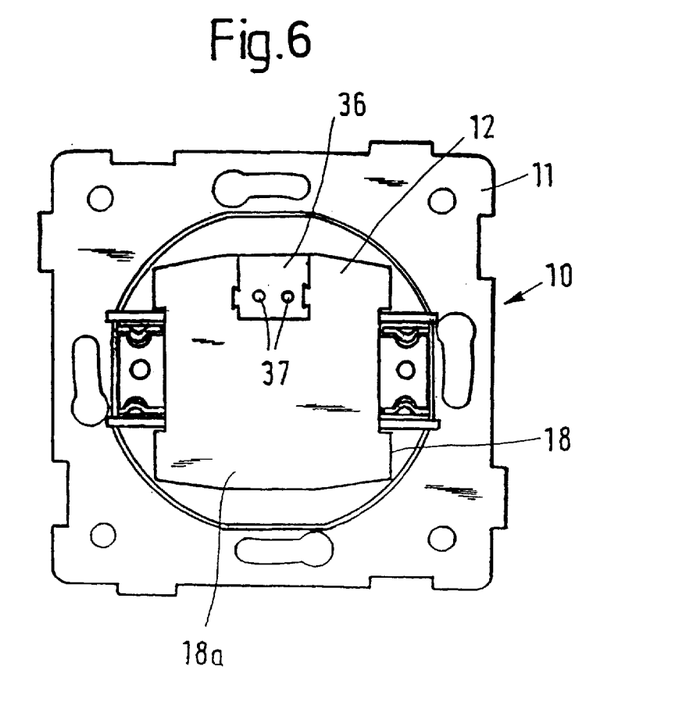

As illustrated in FIGS. 4 and 5, a casing 18 is formed on the rear of the base 12, which in this case is an integral part of the base 12. This casing 18 has the rear end face closed by a removable lid 18a. The casing 18 contains the bus coupler BA in the form of an electric circuit, the components of which, in the present case, are mounted on two circuit boards 34, 35. Laterally of the casing 18, the base 12 is provided with a recess 36 into which the plug pins 37 project from the base. A plug (not illustrated) is plugged onto the plug pins 37, the plug being connected to the bus lines 19 (FIG. 1). In this manner, the bus lines 19 are connected to the bus coupler BA.

From the casing 18, two posts 38, 39 integrally formed with the base 12 extend to the front, i.e., towards the cover 16. Each post 38, 39 has a passage 20 or 20a, respectively, extending axially therethrough. Each of the posts 38, 39 extends into a window 22, 22a in the bottom wall 16b of the cover 16. In this case, the windows 22 and 22a are holes, but they may also contain panes or lenses. The posts 38, 39 end flush with the front face of the bottom wall 16b. Close to the cover 16, a photoelectric converter 21 is fastened in the post 38. This converter 21 comprises a light transmitter such as a light-emitting diode 44 as well as the associated driving means. Electric lines 40 connect the converter 21 to the circuit board 34 associated to the bus coupler BA. The photoelectric converter 21 is a light transmitter designated by S. This transmitter has a very small emitting surface directed frontward. An expansion optic 45 in the form of a lens is arranged in front of the converter 21, converting the radiation emanating from the point-shaped light source into an expanded beam of parallel light that leaves the light transmission opening 46 of the socket.

Installed in the passage 20a of the post 39 is a second photoelectric converter 21a, designed here as a light receiver E and comprising a photodiode 48 or a phototransistor. The converter 47 is connected to the circuit board 34 via electric lines 40. In the passage 20a, a focussing optic 49 is disposed in front of the converter 21a, focussing incident light onto the light receiving surface of the photodiode 48. This focussing optic 49 is arranged in the light transmission opening 50 in immediate proximity to the front surface of the bottom wall 16b of the cover 16.

Figure 7:
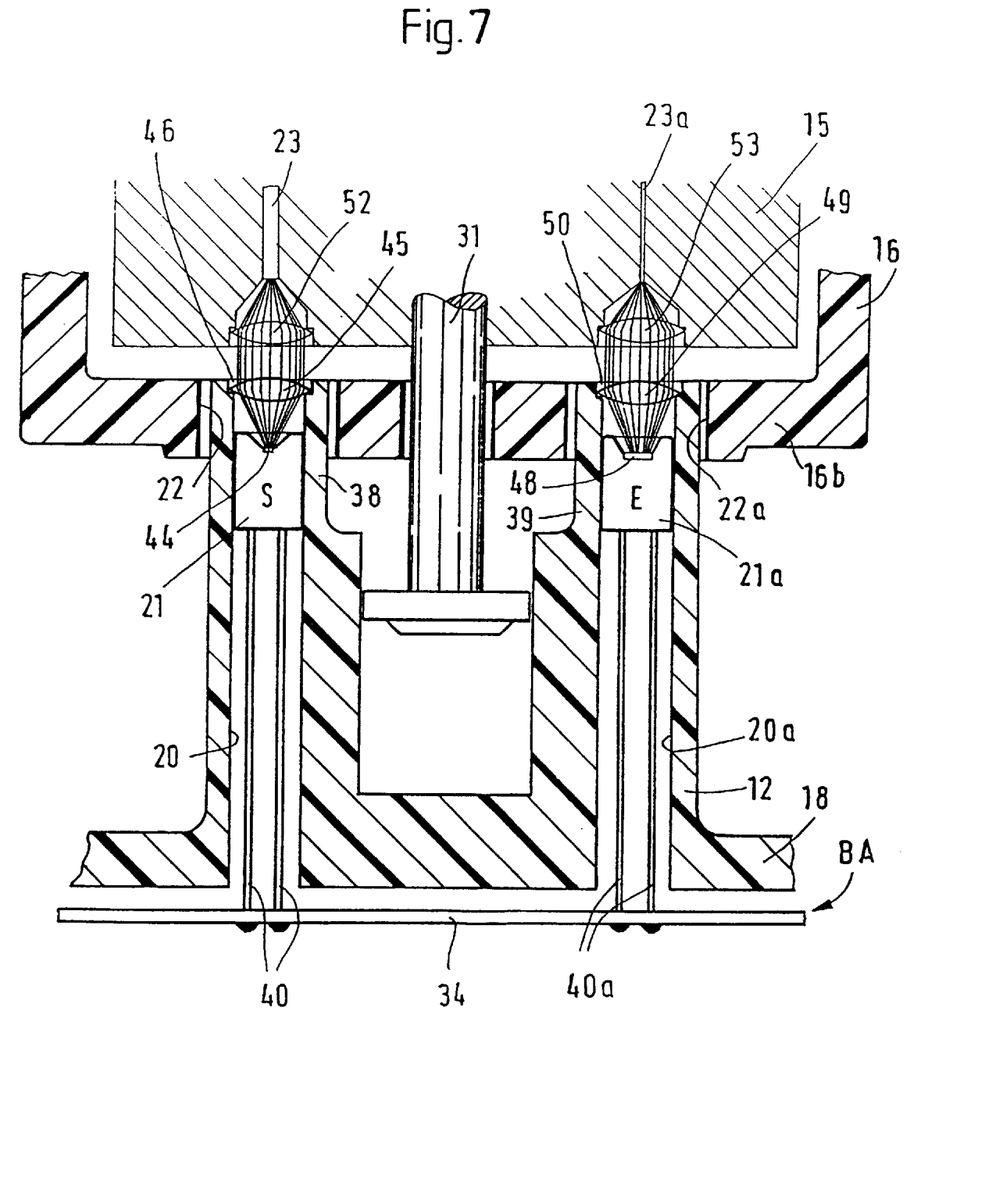

In FIG. 7, the plug associated to the socket is only drawn in phantom lines and designated by 15. This plug comprises the ends of two optical waveguides 23, 23a. These ends are fixed exactly in their respective positions in the plug 15. Arranged in the light transmission opening leading to the optical waveguide 23 is a focussing optic 52 focussing light incident in parallel onto the front end of the optical waveguide 23. Within the light transmission opening leading to the other optical waveguide 23a, there is a focussing optic 53 converting the light emanating from the end of the optical waveguide 23a into an expanded beam of parallel light.

As can be seen from FIG. 7, only parallel light is transported in the gap between the plug 15 and the bottom wall 16b. Upon misalignments of the plug 15 with respect to the socket 10, only part of the light will not travel from the light source to the associated light receiver, however, it is made sure that a substantial amount of the light reaches the receiver or the optical waveguide. Similarly, the distance of the front face of the plug 15 from the bottom wall 16b is not critical, since the parallel light will pass a possible gap without substantial losses.

The bus coupling unit BA comprises a digital or analogue data processing circuit in the form of one or a plurality of integrated circuits. It converts signal telegrams coming in on the bus lines 19 into corresponding signals for the connected electric appliance. Via the lines 45, these signals are communicated to the converter 21 which transmits corresponding light signals which are transmitted via the optical waveguide 23, extending through the cable 24, to the electric appliance, where they are converted into electric signals.

On the other hand, electric signals generated by a control means or a sensor of the electric appliance are first converted into light signals transmitted via the optical waveguide 23a through the cable 24. These light signals are coupled into the photoelectric converter 21a of the socket 10 where they are converted into electric signals supplied to the bus coupler via the electric lines 40a. The bus coupler converts these signals into telegrams sent via the bus line 19.

Figure 7A:
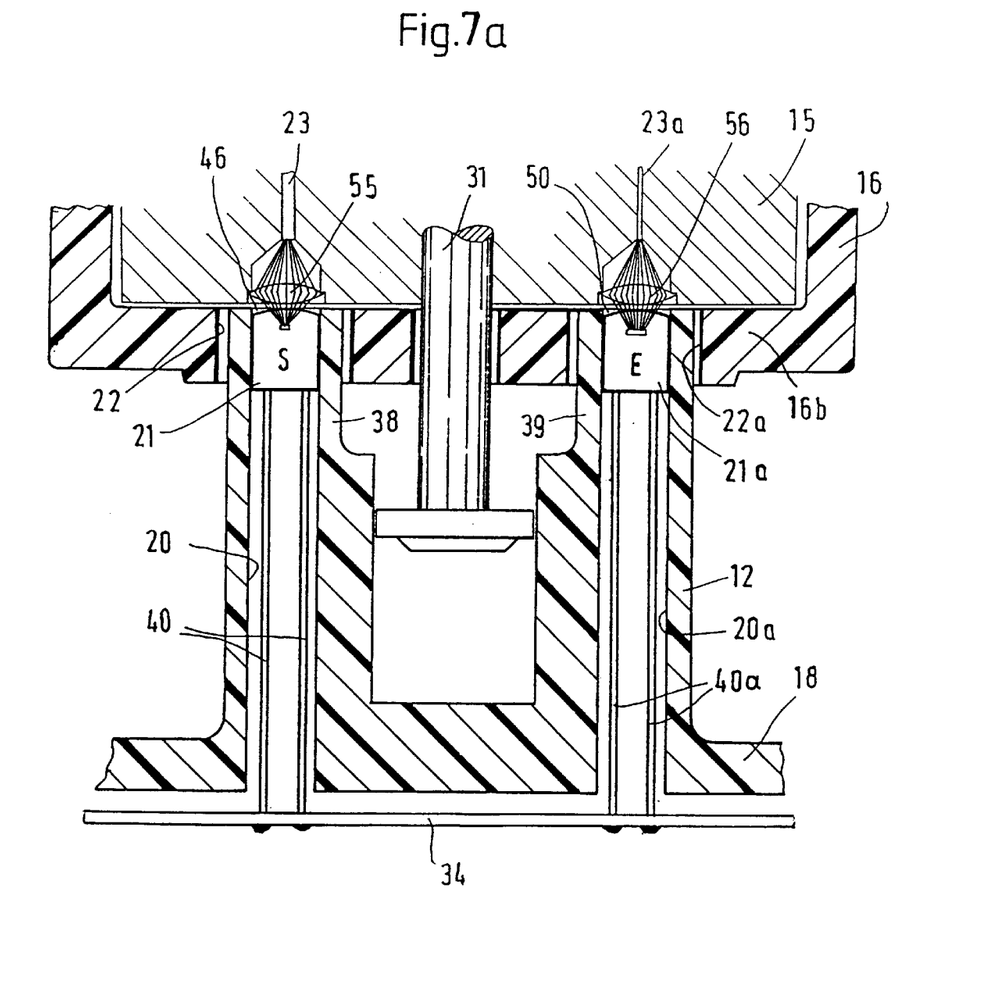

In the embodiment of FIG. 7a, the photoelectric converters 21 and 21a are arranged such that they are located at the ends of the passages 20 and 20a, their diodes being disposed in immediate proximity to the front face of the bottom wall 16b. Provided in the plug 15 are two imaging optics 55 and 56. The imaging optic 55 creates an image of the light source of the converter 21 on the front end face of the optical waveguide 23 and the imaging optic 56 creates an image of the front end face of the optical waveguide 23a on the light receiver of the converter 21a. Therefore, a single optic suffices for each light path.

Figure 7B:
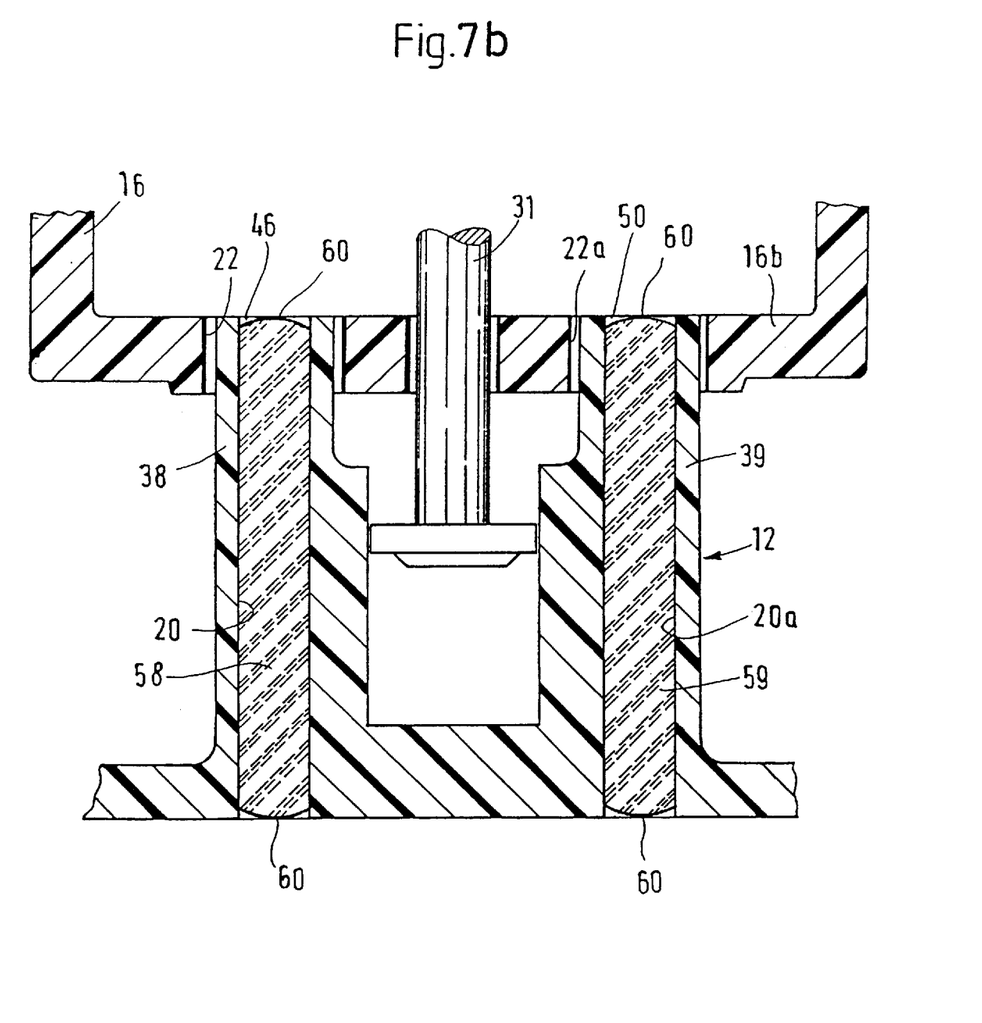

In the embodiment of FIG. 7b, no electric conductors are provided in the passages 20, 20a, but there are light guides 58 and 59 in the form of rods made of glass or another light guiding material. These light guides have their ends provided with convex lenses 60 formed thereto. In this embodiment, the photoelectric converters are arranged in the casing of the bus coupler BA and the light transmission through the base 12 occurs via the light guides 58, 59 that have their sides encapsulated in a light-tight manner. The casing 18 housing the bus coupler BA is also closed in a light-tight manner.

Figure 7C:
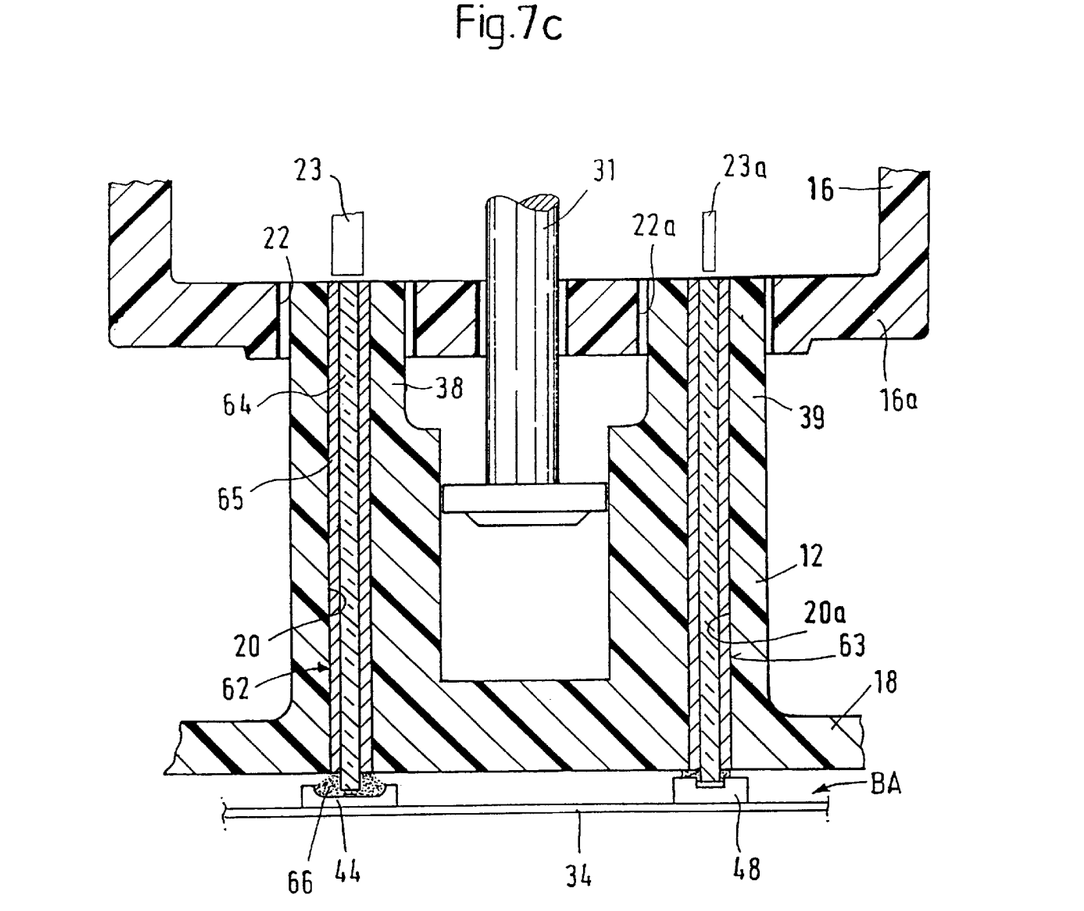

In the embodiment of FIG. 7c, optical waveguides 62 and 63 extend through the passages 20 and 20a, each consisting of a glass fiber 64 and a light-impervious sheath 65. The front ends of the optical waveguides 62 and 63 terminate planarly at the front ends of the posts 38, 39 in a plane with the front face of the bottom wall 16a of the cover. The rear end of the glass fiber 64 protrudes into the casing, Opposite this end, there is the light-emitting diode 44 that is mounted directly on the circuit board 34. By means of a light-impervious adhesive 66, the projecting end of the glass fiber 64 is fastened on the light receiving surface of the diode 44 so that the entire light radiation sent from the light-emitting surface of the diode 44 is input into the glass fiber 64.

Similarly, the light receiving diode 48 is also mounted on the circuit board 34 and coupled to the glass fiber of the optical waveguide 63.

Figure 8:
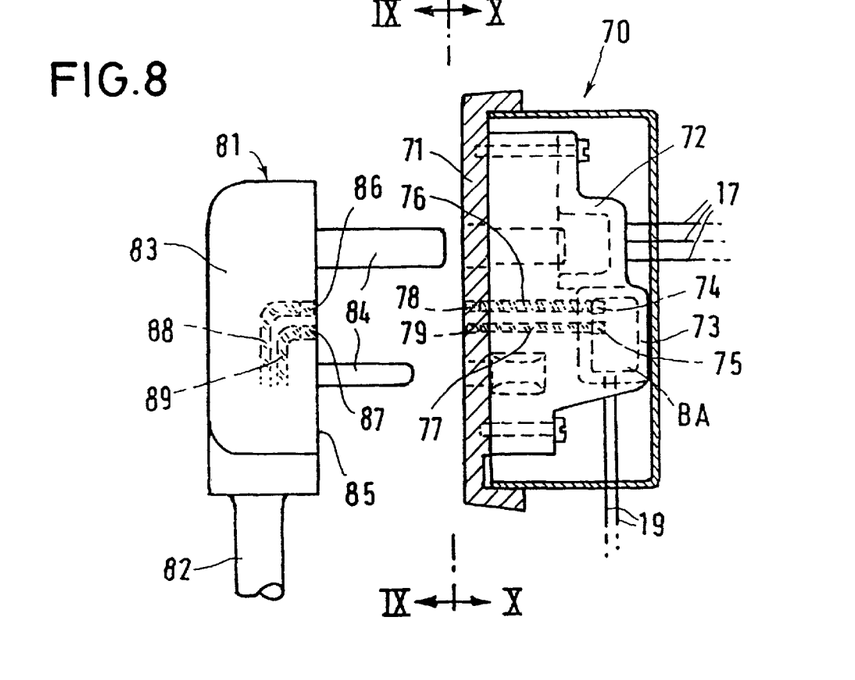
FIG. 8 is an illustration of a plug device corresponding to the British system.
Figures 9, 10:
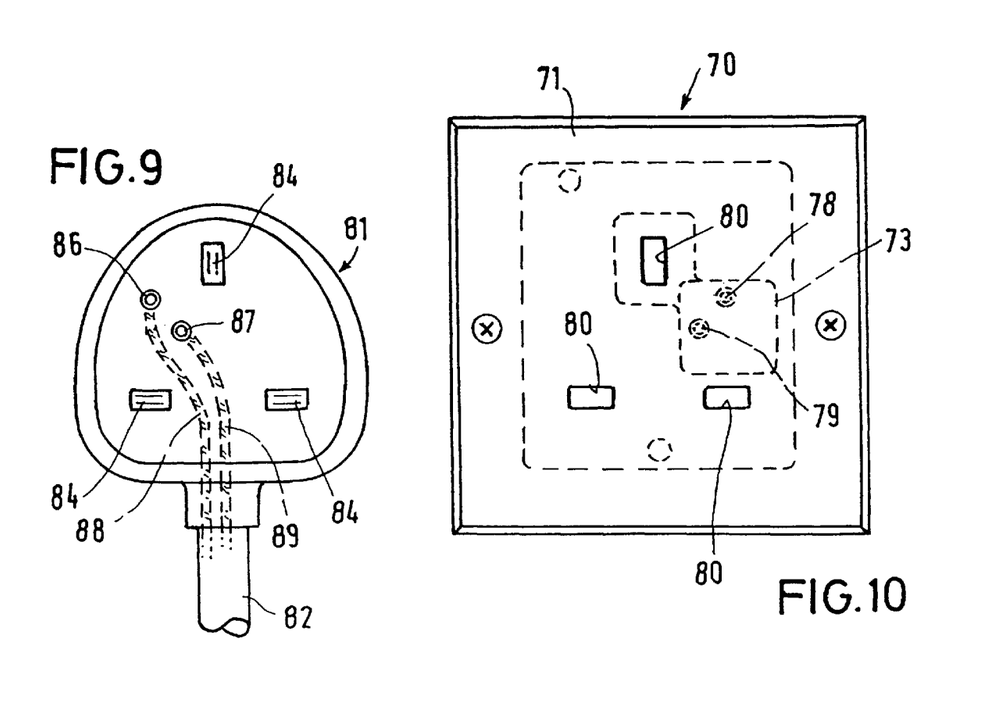
FIG. 9 shows a view of the plug of FIG. 8 in the direction of the arrows IX—IX in FIG. 8.
FIG. 10 is a view of the socket in the direction of the arrows X—X in FIG. 8.

FIGS. 8–10 schematically illustrate a plug device common in Great Britain. In this case, the socket 70 has a support plate 71 with a socket 72 of plastics material fastened thereto, in which socket the contact elements for the plug pins are arranged and which has terminal clamps for main lines 17. Formed to the base 72 is a casing 73 including the bus coupler BA. The bus coupler BA may be connected to an external bus line 19. It is connected to two photoelectric converters 74, 75 from which light guides 76, 77 lead to a window 78, 79 in the support plate 71, respectively. In FIG. 10, the holes in the support plate 71 for the passage of the plug pins are designated by 80.

The plug 81 connected with a cable 82 has a plug body 83 from which three rectangular plug pins 84 project that may be inserted into the holes 80. At the front side 85 of the plug 81, windows 86, 87 are provided that register with the windows 78, 79 when the plug is plugged into the socket. From the windows 86, 87, light guides 88, 89 extend through the cable 82 to the connected external appliance.

Figure 11:
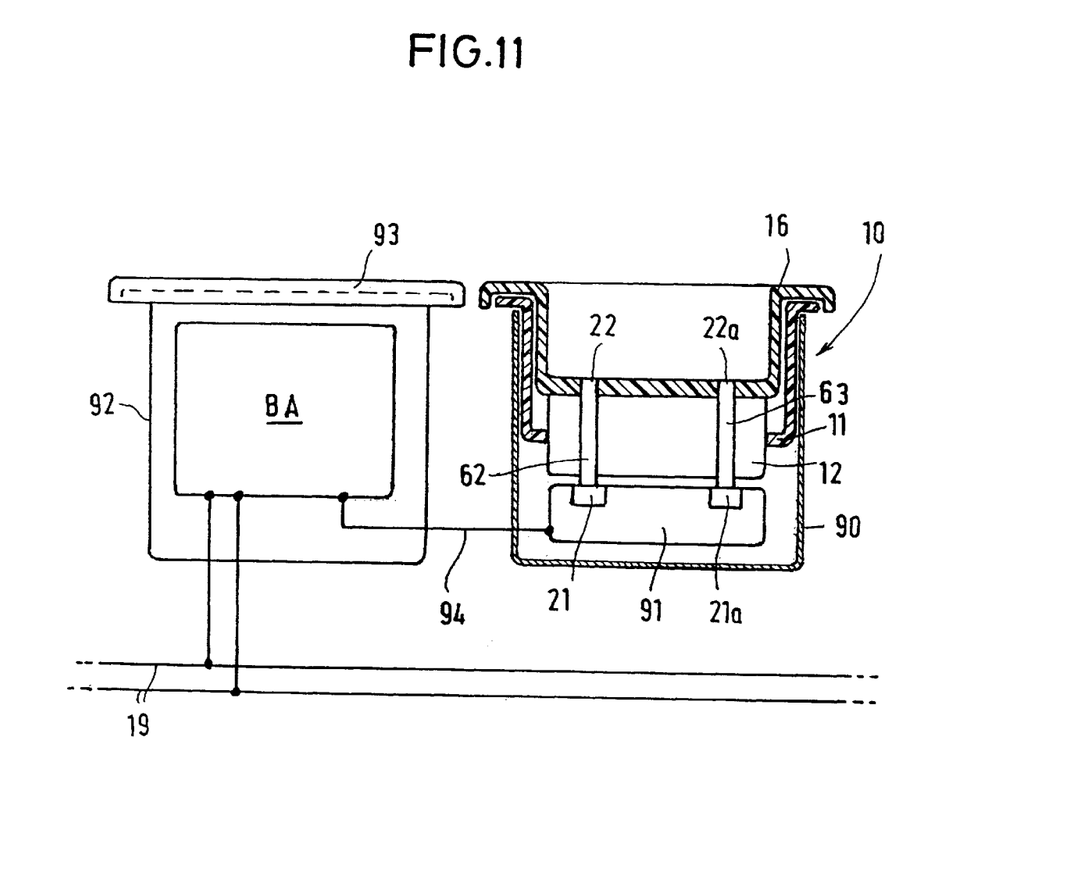
FIG. 11 is a schematic illustration of a terminal device with a separately disposed bus coupler.

In the embodiment of FIG. 11, a socket 10 is provided that is housed in a flush socket. The socket 10 comprises a holder 11 supporting the base 12. The socket is provided with a cover 16 in a manner known, the cover 16 being pot-shaped in this instance. The base 12 is traversed by light guides 62, 63, each connected to a photoelectric converter 21, 21a. The light guides end in a window 22, 22a, respectively, in the bottom of the cover 16. The photoelectric converters 21, 21a are housed in a converter unit 91 at the rear of the base 12.

The bus coupler BA is located separately from the socket 19 in another wall socket 92 covered by a blind cover 93. The building-side bus line 19 is connected to the bus coupler BA. Further, a line connection 94 extends from the bus coupler BA through the walls of the wall sockets 92 and 90 to the converter unit 91.

Figure 12:
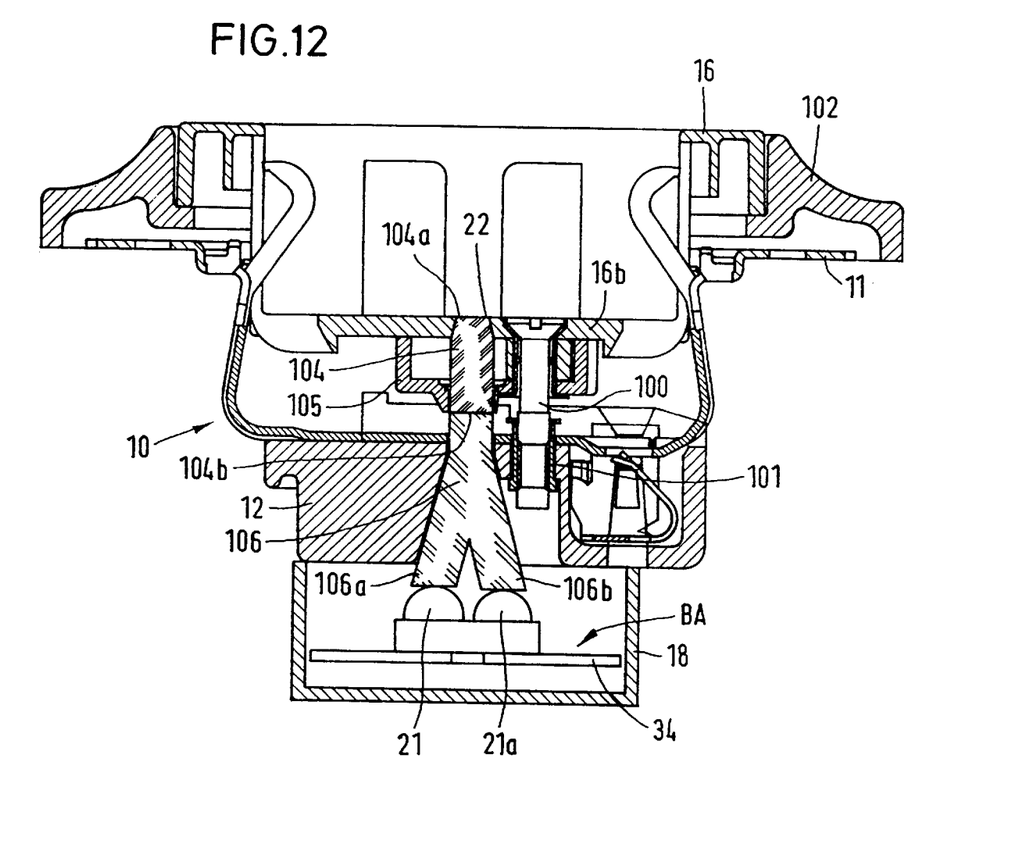
FIG. 12 is a section through a further embodiment of the terminal device with a single Y-shaped optical waveguide.

The socket 10 of FIG. 12 comprises a holder 11 with the base 12 connected to the rear thereof. Set into the holder 11 is the pot-shaped cover 16, through the bottom 16b of which a screw 100 is passed and screwed into a threaded hole 101 of the base 12. The cover 16 is set against a frame 102 supported on the wall and set into the socket 10.

On the rear of the bottom 16b of the cover 16, a light guide 104 is fastened in a window 22 by means of a holding means 105. The light guide 104 is a short guide rod, one front face 104a of which is arranged in the window 22 and the other front face 104b is directed rearward. The light guide is part of the cover 16.

Adjoining the light guide 104 is the stem of a Y-shaped light guide 106 fastened in the base 12 and protruding forward out from the base 12. Both branches 106a, 106b of the light guide 106 lead to a photoelectric converter 21 and 21a, respectively. These converters are arranged on a circuit board 34 inside a casing 18 fastened behind the base 12. The circuit board 34 carries the bus coupling unit BA. For example, the converter 21 is the transmitter and the converter 21a is the receiver. The front faces of the light guides 104 and 106 flatly abut so that the light is transferred between these front faces.

Since a light guide 104 is particularly provided at the cover 16, the front face 104a of which is flush with the bottom 16b, it is guaranteed that a perfect coupling between the light guide (not illustrated in FIG. 12) of the plug and the light guide 104 will occur, no matter how far the cover 16 protrudes into the holder 11. It has to be considered in this context that the distance by which the cover 16 reaches into the frame 11 depends on the thickness of the layer of wallpaper on the wall. If the light guide 104 were part of the frame 11, its front face 104a would not always extend in flush with the bottom 16b of the cover 16. According to FIG. 12 a possible positional adjustment of the cover 16 is obtained by forming a gap between the light guides 104 and 106.

According to FIG. 12, the data transfer occurs via a single light guide path which, however, may comprise a plurality of light guide sections. For such transfer, a semi-duplex mode is provided wherein the data transfer takes place in only one particular direction at a time, i.e., transmission and reception occur subsequently in time.

Although a preferred embodiment of the invention has been specifically illustrated and described herein, it is to be understood that minor variations may be made in the apparatus without departing from the spirit and scope of the invention, as defined the appended claims.

We claim:

1. An electrical plug device comprising a socket (10) for mounting in a wall which houses electric bus lines (19) and main lines (17), said socket (10) having a base (12) fastened to a holder (11), said base (12) including contact elements (13) and terminal clamps (14), said terminal clamps (14) including means for detachably connecting thereto main lines (17), said base (12) having a cover (16) closing a front of the holder (11), a window (22, 22a) in said cover (16) for optically coupling an optical waveguide (23, 23a) of a plug (15) to the socket (10), the socket (10) having at least one photoelectric converter (21, 21a) with which the optical waveguides (23, 23a) of the plug (15) are coupled optically through the window (22, 22a), said at least one photoelectric converter (21, 21a) being electrically connected to an electronic bus coupler (BA) connected to a bus line (19), and said electronic bus coupler (BA) being interfaced between the wall electric bus lines (19) and at least one of the photoelectric converters (21, 21A) and the optical waveguides (23, 23a).

2. The electrical plug device as defined in claim 1 wherein the electronic bus coupler (BA) is fastened to the base (12).

3. The electric plug device as defined in claim 2 wherein the electronic bus coupler (BA) is disposed on a side of the base (12) facing away from the cover (16), and passages (20, 20a) for optic and electric lines extend through the base (12).

4. The electrical plug device as defined in claim 2 wherein the electronic bus coupler (BA) is arranged in a rear casing (18) of the base (12) which includes terminal means (37) for connection to the electric bus lines (19).

5. The electrical plug device as defined in claim 2 wherein the electronic bus coupler (BA) is housed in a casing formed integrally with and protruding laterally from the base (12).

6. The electrical plug device as defined in claim 2 wherein a light transmission opening (46, 50) is arranged substantially flush with a bottom wall (16b) of the cover (16).

7. The electrical plug device as defined in claim 1 wherein a light transmission opening (46, 50) is arranged substantially flush with a bottom wall (16b) of the cover (16).

8. The electrical plug device as defined in claim 7 wherein the electronic bus coupler (BA) is disposed on a side of the base (12) facing away from the cover (16), and passages (20, 20a) for optic and electric lines extend through the base (12).

9. The electrical plug device as defined in claim 1 wherein the at least one photoelectric converter (21, 21a) is housed in a tubular post (38, 39) projecting from the base (12), and said at least one photoelectric converter (21, 21a) is coupled to the electronic bus coupler (BA) through electric lines (40, 40a).

10. The electrical plug device as defined in claim 9 wherein the electric lines (40, 40a) extend through the tubular post (38, 39).

11. The electrical plug device as defined in claim 1 including at least one light guide (58, 59; 62, 63) extending through the base (12), and said at least one light guide (58, 59; 62, 63) being optically coupled to at least one photoelectric converter (21, 21a) through the window (22, 22a) of the holder (11).

12. The electrical plug device as defined in claim 11 wherein an end of the at least one light guide (62, 63) is fixed to the at least one photoelectric converter (21, 21a) by means of an adhesive (66).

13. The electrical plug device as defined in claim 12 wherein the at least one light guide (58, 59; 62, 63) includes at least one lens (60).

14. The electrical plug device as defined in claim 11 wherein the at least one light guide (58, 59; 62, 63) includes at least one lens (60).

15. The electrical plug device as defined in claim 1 including an expansion optic (45) for expanding light emitted from the at least one photoelectric converter (21, 21a) in substantially parallel light rays.

16. The electrical plug device as defined in claim 1 including a focusing optic (49) for focusing parallel incident light onto a receiving surface of the at least one photoelectric converter (21, 21a).

17. The electrical plug device as defined in claim 1 including an imaging optic (55) for focusing light emitted by the at least one photoelectric converter (21, 21a) onto an end of the optical waveguide (23, 23a).

18. The electrical plug device as defined in claim 1 including an imaging optic (56) for focusing light emitted from the optical waveguide (23, 23a) onto a light receiving surface of the at least one photoelectric converter (21, 21a).

19. The electrical plug device as defined in claim 1 wherein the electronic bus coupler (BA) is connected to two photoelectric converters (21, 21a), at least one of said two photoelectric converters (21, 21a) is a light emitter (S) and another of said two photoelectric converters (21, 21a) is a light receiver (E).

20. The electrical plug device as defined in claim 1 wherein the socket (10) includes non-reversibility means (31) for allowing the plug (15) to be plugged only in one orientation.

21. The electrical plug device as defined in claim 1 wherein the electronic bus coupler (BA) is a component separate from the socket (10).

22. The electrical plug device as defined in claim 1 wherein the socket (10) includes a photoelectric converter (106) in communication with the at least one photoelectric converters (21, 21*a*) and said photoelectric converter (106) is coupled to the optical waveguide (23, 23*a*) through a single window (22, 22*a*).

23. The electrical plug device as defined in claim 22 wherein the photoelectric converter (106) is a Y-shaped light guide (106).

24. The electrical plug device as defined in claim 23 wherein the Y-shaped light guide (106) includes a first light guide section (104) fastened to the cover (16) and a second light guide section (106) fastened to the base (12).

25. An electrical plug device comprising a socket (70) for mounting in a wall which houses electric bus lines (19) and main lines (17), said socket having a base (72) fastened to a support plate (71), said socket (70) carrying contact elements (13) and terminal clamps (14), said terminal clamps (14) including means for detachably connecting said terminal clamps (14) to the main lines (17), said socket having at least one photoelectric converter (74, 75) to which an optical waveguide (88, 89) of a plug (15) may be coupled optically through a window (78, 79) of the support plate (71), said at least one photoelectric converter (74, 75) being electrically connected to an electronic bus coupler (BA), and said electronic bus coupler (BA) being connected to the electric bus lines (19) of the wall.

26. The electrical plug device as defined in claim 25 wherein the electronic bus coupler (BA) is fastened to the base (72).

27. The electrical plug device as defined in claim 26 wherein the electronic bus coupler (BA) is arranged in a rear casing (18) of the base (72) which includes terminal means (37) for connection to the electric bus lines (19).

28. The electrical plug device as defined in claim 26 wherein the electronic bus coupler (BA) is housed in a casing formed integrally with and protruding laterally from the base (72).

29. The electrical plug device as defined in claim 25 wherein the electronic bus coupler (BA) is a component separate from this socket (70).

* * * * *